(12) United States Patent
Yoda (10) Patent No.: US 7,190,523 B2
(45) Date of Patent: Mar. 13, 2007

(54) WAVELENGTH-TUNABLE OPTICAL FILTER

(75) Inventor: Mitsuhiro Yoda, Suwa (JP)

(73) Assignee: Seiko Epson Corporation (JP)

( * ) Notice: Subject to any disclaimer, the term of this patent is extended or adjusted under 35 U.S.C. 154(b) by 390 days.

(21) Appl. No.: 10/861,229

(22) Filed: Jun. 3, 2004

(65) Prior Publication Data

US 2005/0007933 A1    Jan. 13, 2005

(30) Foreign Application Priority Data

Jul. 7, 2003 (JP) ............................ 2003-192643

(51) Int. Cl.
*G02B 27/00* (2006.01)
(52) U.S. Cl. ...................... 359/579; 359/587; 359/589
(58) Field of Classification Search ................ 359/579, 359/587, 589
See application file for complete search history.

(56) References Cited

U.S. PATENT DOCUMENTS 6,341,039 B1    1/2002   Flanders et al.

2002/0048301 A1 *  4/2002  Wang et al. .................. 372/45

FOREIGN PATENT DOCUMENTS

| JP | 2002-023070 | 1/2002 |
|----|-------------|--------|
| JP | 2002-243937 | 8/2002 |
| JP | 2003-177336 | 6/2003 |
| JP | 2003-185941 | 7/2003 |

* cited by examiner

*Primary Examiner*—Fayez G. Assaf
(74) *Attorney, Agent, or Firm*—Harness, Dickey & Pierce, P.L.C.

(57) ABSTRACT

A wavelength-tunable optical filter includes a stationary mirror, a movable mirror disposed so as to face the stationary mirror, an actuating plate for actuating the movable mirror, and a peripheral supporting portion holding the actuating plate which are disposed above a base layer. The movable mirror is displaced by applying a voltage between the electrodes provided on the actuating plate and the base layer, and the actuating plate is disposed between the movable mirror and the peripheral supporting portion so as to be displaced due to an electrostatic force.

11 Claims, 4 Drawing Sheets

DISPLACEMENT (ARBITRARY UNIT)

K1 : K2 = 1 : 1
FREQUENCY 16000 Hz

(b)

DISPLACEMENT (ARBITRARY UNIT)

K1 : K2 = 1 : 2
FREQUENCY 14000 Hz

FIG. 4

WAVE FORM OF INPUT VOLTAGE

FIG. 5

DISPLACEMENT OF ACTUAING PLATE

FIG. 6

MAGNIFIERD DISPLACEMENTS
K1 : K2 = 1 : 40

WAVELENGTH-TUNABLE OPTICAL FILTER

RELATED APPLICATIONS

This application claims priority to Japanese Patent Application No. 2003-192643 filed Jul. 7, 2003 which is incorporated by reference in its entirety.

BACKGROUND OF THE INVENTION

1. Field of the Invention

The present invention relates to an electrostatic-actuation type wavelength-tunable optical filter making use of the principle of a Fabry-Perot interferometer, and more particularly it relates to a wavelength-tunable optical filter which can be actuated at low voltage.

2. Description of the Related Art

Figure 7:
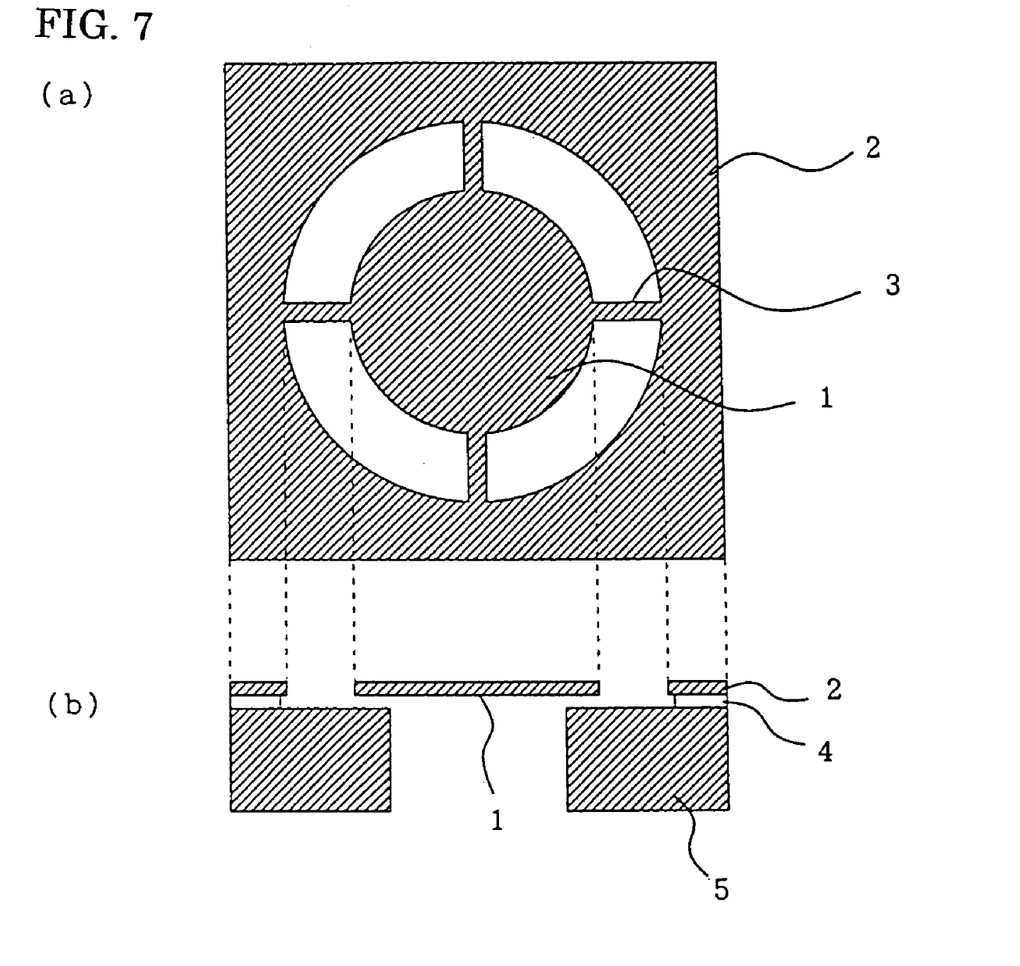
FIGS. 7(a) and 7(b) are partial sectional views of an example of a known wavelength-tunable optical filter.

FIGS. 7(a)–(b) are partial sectional views of an example of an electrostatic-actuation type wavelength-tunable optical filter which has been used for a wavelength-division multiplex (WDM) optical communication-network, wherein FIG. 7(a) is a horizontal sectional view illustrating a movable plate 1 having a movable mirror (not shown) fixed thereto and a spring portion 3 connecting the movable plate 1 to a peripheral portion 2, and FIG. 7(b) is a vertical sectional view illustrating the movable plate 1, the peripheral portion 2, an insulating portion 4, and an electrode portion 5, these two members being disposed below the movable plate 1 and the peripheral portion 2. The movable plate 1 has the movable mirror fixed to the upper surface thereof. When a periodic voltage is applied between the movable plate 1 and the electrode portion 5, an electrostatic force is exerted on the movable plate 1. Thus, the movable plate 1 moves periodically in the vertical direction such that a balance between forces of the elastic spring portion 3 and the electrostatic force is maintained. The wavelength-tunable optical filter shown in FIG. 7 makes use of the principle of a Fabry-Perot interferometer, and the principle will be described in detail later.

Also, in some of known electrostatic-actuation type wavelength-tunable Fabry-Perot filters, a portion of the filter corresponding to the spring portion 3 shown in FIG. 7 is spirally bent, and a hinge (spring portion) is made more flexible so that a membrane (movable plate) can move smoothly (see FIG. 3 in U.S. Pat. No. 6,341,039, for example).

In the known electrostatic-actuation type wavelength-tunable optical filter shown in FIG. 7, if the distance between the movable plate 1 and the electrode portion 5 is made larger in order to achieve a large displacement of the movable plate 1, since the electrostatic force is in inverse proportion to the square of the distance between the movable plate 1 and the electrode portion 5, the voltage to be applied must be increased. On the other hand, if the distance between the movable plate 1 and the electrode portion 5 is made smaller in order to prevent an increase in the voltage to be applied, the displacement of the movable plate 1 is limited since it hits against the electrode portion 5 when moving downward. Hence, a low-voltage actuation and a large displacement cannot be achieved at the same time.

Also, when a sharply changing voltage such as a pulse voltage is applied between the movable plate 1 and the electrode portion 5, the movable plate 1 moves beyond a desired position, that is, causes a problem of a so-called overshooting is caused.

In addition, in the known electrostatic-actuation type wavelength-tunable Fabry-Perot filter (see the foregoing patent document, for example), a low-voltage actuation and a large displacement of a membrane (movable plate) cannot be achieved at the same time similar to the wavelength-tunable optical filter shown in FIG. 7, and a problem of an overshooting of the membrane occurs.

SUMMARY OF THE INVENTION

Accordingly, it is an object of the present invention to provide a wavelength-tunable optical filter in which a movable plate can be actuated at low voltage achieving a large displacement, and is prevented from being overshot even when a sharply changing voltage such as a pulse voltage is applied.

A wavelength-tunable optical filter according to the present invention includes a stationary mirror, a movable mirror disposed so as to face the stationary mirror, an actuating plate for actuating the movable mirror, and a peripheral supporting portion holding the actuating plate which are disposed above a base layer. The movable mirror is displaced by applying a voltage between electrodes provided on the actuating plate and the base layer. At least one actuating plate is disposed between the movable mirror and the peripheral supporting portion so as to be displaced due to an electrostatic force.

By independently disposing the light-reflecting movable mirror and the actuating plate and connecting the movable mirror or a movable plate having the movable mirror fixed thereto to the actuating plate with intervention of a first elastic connecting portion, the displacement of the movable mirror can be amplified more than that of the actuating plate, thereby realizing a wavelength-tunable optical filter in which a large displacement is generated at low voltage. Also, as will be described below, by setting the spring constants of the first connecting portion connecting the movable mirror or the movable plate to the actuating plate and a second connecting portion connecting the actuating plate to the peripheral supporting portion at respectively appropriate values, the amplification factor of the displacement of the movable mirror can be controlled, and the overshooting of the movable mirror can be reduced when a pulse voltage is applied.

Also, in the wavelength-tunable optical filter according to the present invention, the actuating plate has an opening perforated therein, and the movable mirror is disposed in the opening of the actuating plate.

Since the actuating plate has the opening perforated in the central part thereof, and the movable mirror or the movable plate having the movable mirror fixed thereto is disposed in the opening, the movable mirror can be displaced in a stable parallel state. Also, the wavelength-tunable optical filter having the above-mentioned structure including the actuating plate and the movable mirror can be easily fabricated.

In addition, the wavelength-tunable optical filter according to the present invention may further include a movable plate having the movable mirror fixed thereto. The movable plate and the actuating plate are formed of a silicon-on-insulator (SOI) substrate.

Since the movable plate and the actuating plate can be easily formed of an SOI substrate, and the SOI has an insulating layer previously formed thereon, it is not needed to independently form an insulating portion 4 between a peripheral portion 2 and an electrode portion 5, as shown in FIG. 7.

Furthermore, the wavelength-tunable optical filter according to the present invention may further include a movable plate having the movable mirror fixed thereto; and first and second connecting portions respectively connecting the movable plate to the actuating plate and the actuating plate to the peripheral supporting portion. The movable plate, the actuating plate, and the peripheral supporting portion, and the first and second connecting portions are formed of the same material.

Since the movable plate, the actuating plate, the peripheral supporting portion, and the connecting portions are integrally formed of the same material such as an SOI substrate by etching, the movable plate, the actuating plate, the peripheral supporting portion, and the connecting portions can be formed in accordance with corresponding precise patterns.

Moreover, in the wavelength-tunable optical filter according to the present invention, the displacement of the movable mirror is greater than that of the actuating plate caused by actuation.

By appropriately setting the mass of the movable mirror or the movable plate having the movable mirror fixed thereto, the mass of the actuating plate, and the spring constants of the first and second connecting portions respectively connecting the movable plate to the actuating plate and the actuating plate to the peripheral supporting portion, the displacement of the movable plate can be amplified more than that of the actuating plate, thereby realizing a wavelength-tunable optical filter in which a large displacement is generated at low voltage.

Still furthermore, in the wavelength-tunable optical filter according to the present invention, the displacement of the movable mirror is smaller than that of the actuating plate.

Although the actuating plate is overshot as described above when a pulse voltage or the like is applied between the actuating plate and the base layer, by setting the spring constant of the first connecting portion connecting the movable mirror or the movable plate having the movable mirror fixed thereto to the actuating plate at an appropriate value smaller than that of the second connecting portion connecting the actuating plate to the peripheral supporting portion, the overshooting of the movable mirror or the movable plate can be made smaller than that of the actuating plate. Although an approximate value of the ratio of the spring constant of the first connecting portion and the second connecting portion to reduce the overshooting, can be theoretically computed, the ratio is ultimately determined by performing an experiment or the like. Meanwhile, a concrete value of the ratio of the spring constant of the first connecting portion to that of the second connecting portion will be described later.

Still furthermore, in the wavelength-tunable optical filter according to the present invention, the mass of the actuating plate is set such that the period of a natural frequency in a vibration system formed by the movable plate having the movable mirror, the actuating plate, the peripheral supporting portion, and the first and second connecting portions agrees the period of the frequency of an alternating voltage to be applied between the electrodes.

Since a two-degree-of-freedom vibration system formed by the movable plate having the movable mirror fixed thereto, the actuating plate, the peripheral supporting portion, and the first and second connecting portions has two natural frequencies at which the displacement of the movable mirror is drastically amplified. By setting the mass of the actuating plate such that one of these natural frequencies agrees with the frequency of the alternating voltage, the amplification factor of the displacement of the movable mirror with respect to the displacement of the actuating plate can be made greater, so that an absolute amount of the displacement of the movable mirror can be made greater. On this occasion, the period of a vibration of the movable mirror agrees with that corresponding to the frequency of the alternating voltage.

Still furthermore, in the wavelength-tunable optical filter according to the present invention, the spring constants of the first and second connecting portions respectively connecting the movable plate to the actuating plate and the actuating plate to the peripheral supporting portion are set such that the period of a natural frequency in a vibration system formed by the movable plate having the movable mirror, the actuating plate, the peripheral supporting portion, and the first and second connecting portions agrees the period of the frequency of an alternating voltage applied between the electrodes.

By setting the spring constants of the first and second connecting portions and the mass of the movable mirror or the movable plate such that one of the natural frequencies of a vibration system formed by the movable mirror or the movable plate having the movable mirror fixed thereto and the first and second connecting portions agrees substantially with the frequency of an alternating voltage, a fine displacement of the actuating plate causes the movable mirror or the movable plate to be drastically displaced. Meanwhile, although the natural frequencies of the vibration system formed by the movable mirror or the movable plate and the first and second connecting portions are theoretically computed on the basis of the mass of the movable mirror or the movable plate and the spring constant of the first connecting portion, since the mass of the connecting portion must be taken into consideration, the natural frequencies are actually obtained by performing a simulation, an experiment, or the like.

Still furthermore, in the wavelength-tunable optical filter according to the present invention, at least one of the actuating plate and the base layer includes an insulating film.

When the actuating plate comes into contact with the base layer on the occasion of displacement caused by a voltage applied between the actuating plate and the base layer, these members are short-circuited with each other. In order to prevent such short-circuiting, the insulating film is disposed so as to insulate the actuating plate and the base layer from each other.

Still furthermore, in the wavelength-tunable optical filter according to the present invention, the insulating film is composed of a silicon oxide or a silicon nitride.

Since the insulating film for insulating the actuating plate and the base layer from each other is composed of a silicon oxide or a silicon nitride, the insulating film can be easily formed by thermal oxidization or chemical vapor deposition, respectively.

Still furthermore, in the wavelength-tunable optical filter according to the present invention, the first connecting portion connecting the movable plate to the actuating plate includes a plurality of beams.

Since the first connecting portion is formed by the plurality of beams, the movable mirror can be displaced in a stable parallel state. Also, the spring constant of the connecting portion can be easily set.

Still furthermore, in the wavelength-tunable optical filter according to the present invention, the second connecting portion connecting the actuating plate to the peripheral supporting portion includes a plurality of beams.

Since the second connecting portion is formed by the plurality of beams, the actuating plate and the movable mirror can be displaced in a stable parallel state. Also, the spring constant of the second connecting portion can be easily set.

DETAILED DESCRIPTION

First Embodiment

Figure 1:
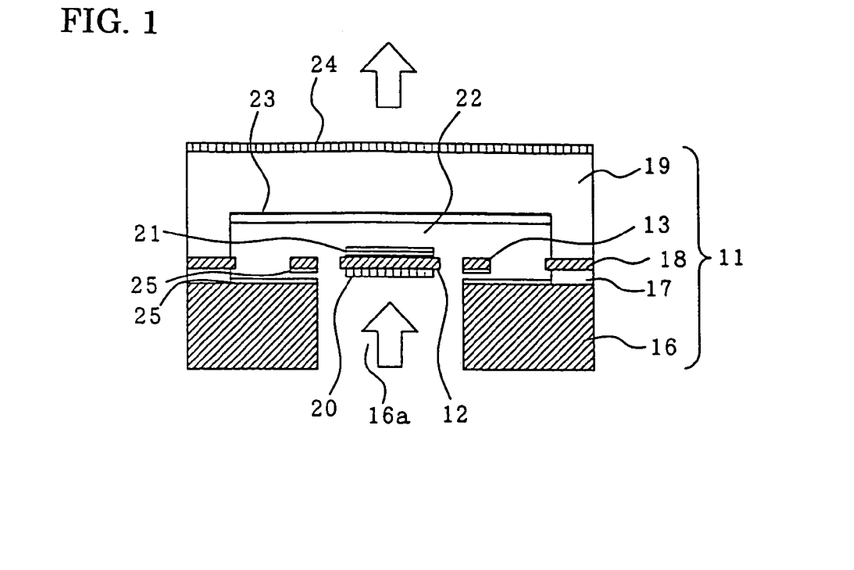
FIG. 1 is a vertical sectional view of a wavelength-tunable optical filter according to a first embodiment of the present invention.

FIG. 1 is a vertical sectional view of a wavelength-tunable optical filter according to a first embodiment of the present invention, and FIGS. 2(a) and 2(b) are respectively horizontal and vertical sectional views of the lower part of the wavelength-tunable optical filter shown in FIG. 1. The wavelength-tunable optical filter according to the first embodiment is comprised of an outer frame serving as a filter's main body 11, a movable plate 12, an actuating plate 13, a first connecting portion 14 (shown in FIG. 2(a) although not shown in FIG. 1) connecting the movable plate 12 to the actuating plate 13, and a second connecting portion 15 (shown in FIG. 2(a) although not shown in FIG. 1) connecting the actuating plate 13 to a peripheral supporting portion 18. As shown in FIG. 2(a), the actuating plate 13 has an opening 13a formed in the central part thereof and the movable plate 12 is disposed in the opening 13a with intervention of the first connecting portion 14. Also, the actuating plate 13 is surrounded by openings 18a.

Although each of the first and second connecting portions 14 and 15 is formed by four beams in FIG. 2(a), the number of beams is not limited to four. However, each of the first and second connecting portions 14 and 15 is desirably formed by at least two beams. If each of the first connecting and second connecting portions 14 and 15 is formed by a single beam, as will be described later, the movable plate 12 and the actuating plate 13 are unstably displaced since these two plates cannot maintain a parallel state. Here, four beams formed inside thereof are collectively called the first connecting portion 14, and the other four beams formed outside thereof are collectively called the second connecting portion 15.

In the filter shown in FIG. 2(a), although the movable plate 12 has a disk shape, and the actuating plate 13 has a ring shape surrounding the movable plate 12, the movable plate 12 may have, for example, a polygonal shape so that the actuating plate 13 surrounds the movable plate 12. Alternatively, two or more actuating plates may be disposed so as to surround the actuating plate 13.

As shown in FIG. 1, the filter's main body 11 is formed by a base layer 16 composed of silicon, a silicon oxide layer 17 composed of a silicon oxide, the peripheral supporting portion 18 composed of silicon, and a glass substrate 19 composed of borosilicate glass. The base layer 16, the silicon oxide layer 17, and the peripheral supporting portion 18 are formed from a silicon-on-insulator (SOI) substrate, and also, the movable plate 12, the actuating plate 13, the first and second connecting portions 14 and 15, and the peripheral supporting portion 18 are integrally formed in a silicon layer which is an upper-layer of the SOI substrate. The base layer 16 is provided with an electrode (not shown) and has an opening 16a perforated therein, slightly greater than the movable plate 12 so that the movable plate 12 can be greatly displaced. The opening 16a serves as an entrance opening of light. The silicon oxide layer 17 serves as an insulating layer.

Meanwhile, the movable plate 12, the actuating plate 13, the first and second connecting portions 14 and 15, and the peripheral supporting portion 18 may be formed of respectively different materials and be composed of materials other than silicon. Also, the base layer 16 and the silicon oxide layer 17 may be formed of a glass substrate or the like, and the electrode of the base layer may be independently disposed. In addition, a reflective film or the like serving as a movable mirror may be directly connected to the first connecting portion 14 without the movable plate 12.

The movable plate 12 has an antireflective film 20 disposed on the lower surface thereof, formed of a multilayer film composed of a silicon oxide and the like, and has a reflective film 21 disposed on the upper surface thereof, formed of a multilayer film composed of a silicon oxide, a silicon nitride, and the like. The reflective film 21 serves as a movable mirror and has a high reflectance of about 98%. The glass substrate 19 has a recess 22 formed in its lower surface to be bonded to the peripheral supporting portion 18, and the recess 22 has a reflective film 23 disposed on the upper surface thereof so as to face the reflective film 21. The reflective film 23 serves as a stationary mirror, has a high reflectance of about 98%, and is formed so as to lie parallel to the reflective film 21. The glass substrate 19 has an antireflective film 24 disposed on the upper surface thereof. An insulating film 25 composed of a silicon oxide or a silicon nitride is disposed respectively on the lower surface of the actuating plate 13 and above the upper surface of the base layer 16.

Figure 2:
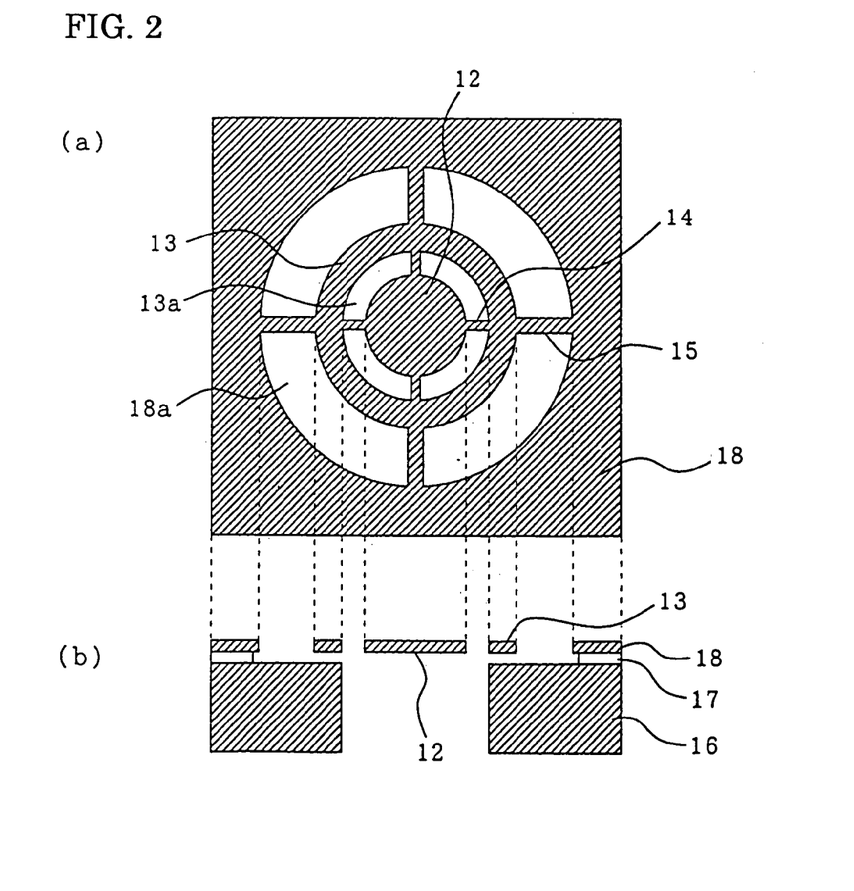
FIGS. 2(a) and 2(b) are respectively horizontal and vertical sectional views of the lower part of the wavelength-tunable optical filter shown in FIG. 1.

The wavelength-tunable optical filter shown in FIGS. 1 and 2 makes use of the principle of a Fabry-Perot interferometer and is used, for example, for monitoring or spectrometric analysis of light of each wavelength incident on an optical fiber used in a wavelength-division multiplex (WDM) optical communication-network.

An operation of the wavelength-tunable optical filter will be described. A voltage is applied between the base layer 16 and the actuating plate 13. The voltage is, for example, an alternating voltage of 60 Hz or a rectangular-shaped voltage (pulse voltage) and is fed to the actuating plate 13 via the peripheral supporting portion 18 and the second connecting portion 15. When an electrostatic force is generated between the base layer 16 and the actuating plate 13 due to the above voltage, the actuating plate 13 is displaced toward the base layer 16. On this occasion, the actuating plate 13 is elastically displaced because of elasticity of the second connecting portion 15. Also, the movable plate 12 connected to the actuating plate 13 with the first elastic connecting portion 14 is displaced in accordance with displacement of the actuating plate 13, thereby causing the movable mirror (the reflective film 21) fixed to the movable plate 12 to be displaced. On this occasion, the movable plate 12 is displaced such that the reflective film 21 is kept parallel to the reflective film 23.

Light is incident on the wavelength-tunable optical filter from the lower side of the filter's main body 11 along a lower arrow indicated in FIG. 1 and travels from the opening 16a toward the inside of the filter. The light is hardly reflected from the antireflective film 20 and enters the space between the reflective films 21 and 23. On this occasion, the light passes through the movable plate 12 composed of silicon, since light used for a WDM communication network or the like has a wavelength of 1550 nm or so and is therefore transmitted through silicon. The light entering the space between the reflective films 21 and 23 is repeatedly reflected from the reflective films 21 and 23, is eventually transmitted through the reflective film 23, and is emitted from the upper side of the filter's main body 11 along an upper arrow indicated in FIG. 1. On this occasion, since the glass substrate 19 has the antireflective film 24 disposed on the upper surface thereof, the light is hardly reflected from the boundary surface between the glass substrate 19 and an atmospheric air and is emitted from the filter.

In the process of repeated reflection between the reflective film 23 (stationary mirror) and the reflective film 21 (movable mirror), light having wavelengths which does not satisfy an interference condition corresponding to the distance between the reflective films 21 and 23 is drastically attenuated, and only light having a wavelength which satisfies the interference condition remains and is eventually emitted from the filter. This operation of the filter is based on the principle of the Fabry-Perot interferometer, so that light having a wavelength which satisfies the interference condition is transmitted through the filter. Since the movable plate 12 is displaced in accordance with the displacement of the actuating plate 13, and the distance between the reflective films 21 and 23 varies, the filter can select light having a desired wavelength to be transmitted therethrough.

Figure 3:
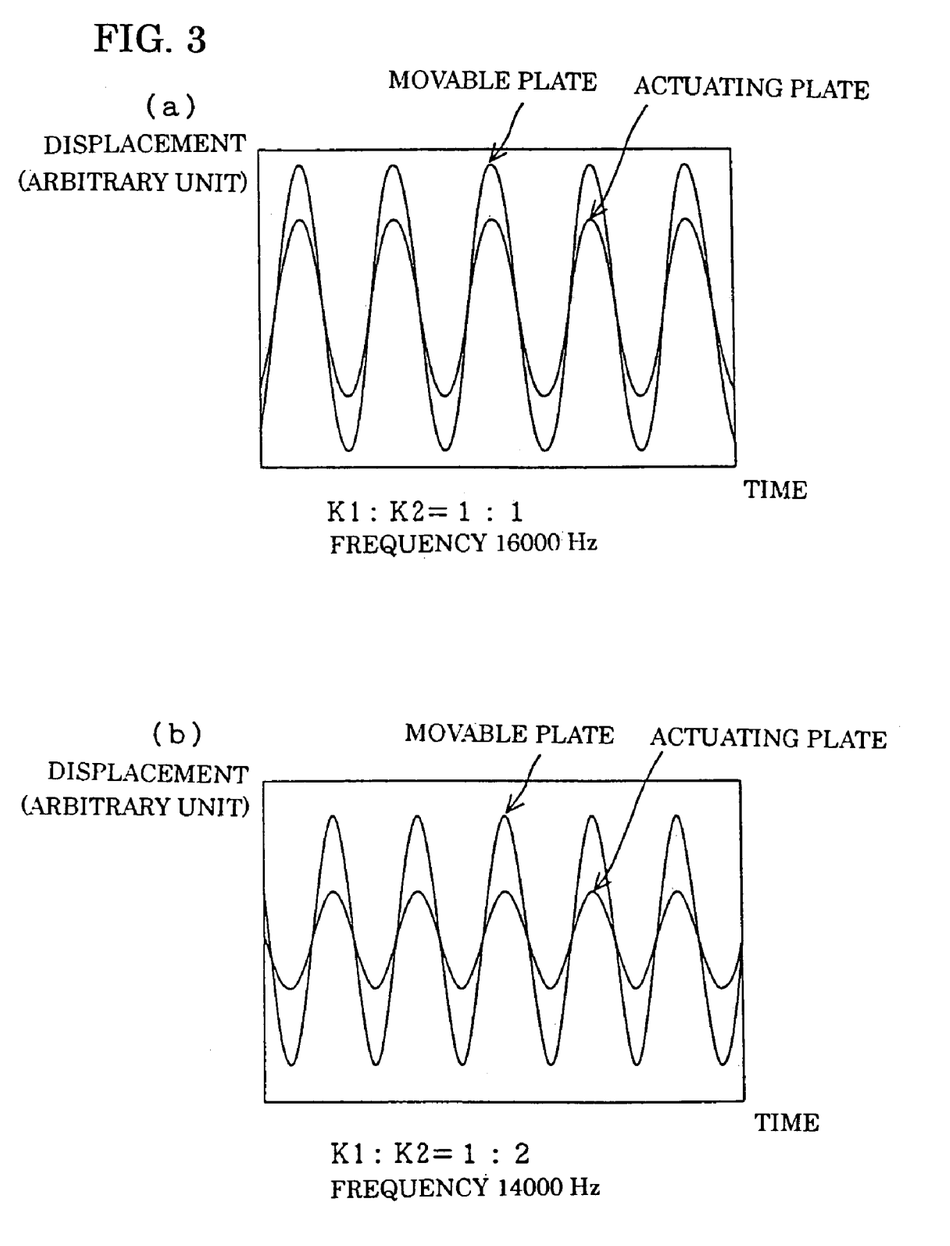
FIGS. 3(a) and 3(b) are graphs illustrating the displacements of a movable plate and an actuating plate when alternating voltages are applied.

FIG. 3 illustrates the displacements of the movable plate 12 and the actuating plate 13 when an alternating voltage is applied between the base layer 16 and the actuating plate 13. In FIG. 3, FIG. 3(a) illustrates the displacements of the movable plate 12 and the actuating plate 13 in the case when the ratio of the mass of the movable plate 12 to that of the actuating plate 13 is 1 to 1, the ratio of the spring constant of the first connecting portion 14 (hereinafter, referred to spring constant K1) to that of the second connecting portion 15 (hereinafter, referred to as spring constant K2) is 1 to 1, and the frequency of an alternating voltage is 16000 Hz. Incidentally, the spring constant of the first connecting portion 14 is the sum of the spring constants of a plurality of beams forming the first connecting portion 14, and the same applies to the second connecting portion 15. Also, the mass of the movable plate 12 includes the masses of the antireflective film 20 and the reflective film 21. Since the alternating voltage is applied between the base layer 16 and the actuating plate 13, the displacements of the movable plate 12 and the actuating plate 13 are periodic, and the displacement of the movable plate 12, that is, the displacement of the movable mirror (the reflective film 21) is about one-and-a-half times that of the actuating plate 13.

Also, FIG. 3(b) illustrates the displacements of the movable plate 12 and the actuating plate 13 in the case when the ratio of the mass of the movable plate 12 to that of the actuating plate 13 is 1 to 1, the ratio of the spring constants K1 to K2 is 1 to 2, and the frequency of an alternating voltage is 14000 Hz. In this case, the displacement of the movable plate 12 is nearly twice that of the actuating plate 13. As described above, by setting the spring constants K1 and K2 at respectively appropriate values, the displacement of the movable plate 12, that is, the displacement of the movable mirror (the reflective film 21) can be made greater with respect to that of the actuating plate 13. In order to change the spring constants K1 and K2, the lengths, widths, shapes, numbers, etc. of beams constituting the first and second connecting portions 14 and 15 are changed. Although the amplification factor of the displacement of the movable plate 12 with respect to that of the actuating plate 13 can be theoretically computed on the basis of the spring constants K1 and K2, the masses of the movable plate 12 and the actuating plate 13, the frequency of an alternating voltage, and so forth, it is actually obtained by performing a simulation or an experiment.

Also, the amplification factor of the displacement of the movable plate 12 with respect to that of the actuating plate 13 can be made greater so as to make an absolute amount of the displacement of the movable plate 12 greater, if the mass of the actuating plate 13 is set such that the natural frequency between the two natural frequencies of a two-degree-of-freedom vibration system formed by the movable plate 12 and the first connecting portion 14 and by the actuating plate 13 and the second connecting portion 15 agrees substantially with the frequency of an alternating voltage. At the same time, the spring constant K1 of the first connecting portion 14, the mass of the movable plate 12, and the spring constant K2 of the second connecting portion 15 may be set at respectively appropriate values. Alternatively, even if the mass of the actuating plate 13 is set such that the higher one between the two natural frequencies of the two-degree-of-freedom vibration system agrees substantially with the frequency of an alternating voltage, the amplification factor of the displacement of the movable plate 12 can be made greater. On this occasion, the period of a vibration of the movable plate 12, that is, the movable mirror (the reflective film 21) agrees substantially with that of the frequency of the alternating voltage. Meanwhile, the frequency of an alternating voltage is not always required to completely agree with one of the two natural frequencies of the two-degree-of-freedom vibration system Instead, it is sufficient that one of the natural frequencies is set so as to be close to the frequency of the alternating voltage.

In the two-degree-of-freedom vibration system formed by the movable plate 12 and the first connecting portion 14 and by the actuating plate 13 and the second connecting portion 15 there are two natural frequencies causing the displacement of the movable plate 12 to be dramatically amplified. The natural frequencies of the two-degree-of-freedom vibration system can be theoretically computed. If the lower one is arranged so as to agree substantially with the frequency of an alternating voltage, the amplification factor of the displacement of the movable plate 12 with respect to that of the actuating plate 13 can be especially made greater, and an absolute amount of the displacement of the movable plate 12 can be also made greater.

As described above, by setting the spring constant of the first connecting portion 14 and the mass of the movable plate 12 as well as the spring constant of the second connecting portion 15 and the mass of the actuating plate 13 at respectively appropriate values, the displacement of the movable plate 12 can be amplified more than that of the actuating plate 13, thereby realizing a wavelength-tunable optical filter in which a large displacement is generated at low voltage. Also, since it is sufficient that the actuating plate 13 makes a small displacement, the gap (distance) between the actuating plate 13 and the base layer 16 can be made smaller.

Also, if the mass of the actuating plate 13 is set such that one of the two natural frequencies of the two-degree-of-freedom vibration system formed by the movable plate 12 and the first connecting portion 14 and by the actuating plate 13 and the second connecting portion 15 agrees substantially with the frequency of an alternating voltage, the amplification factor of the displacement of the movable plate 12 with respect to that of the actuating plate 13 can be made greater, so as to make an absolute amount of the displacement of the movable plate 12 greater.

In addition, by setting the spring constant K1 such that the natural frequency of a vibration system formed by the movable plate 12 and the first connecting portion 14 agrees substantially with the frequency of the alternating voltage, only the movable plate 12 can be displaced with the actuating plate 13 displaced little when an alternating voltage is applied between the base layer 16 and the actuating plate 13. Although the natural frequency of the vibrating system formed by the movable plate 12 and the first connecting portion 14 can be theoretically computed on the basis of the mass of the movable plate 12 and the spring constant K1, since the mass of the first connecting portion 14 and so forth cannot be actually neglected, the spring constant K1 satisfying the above-mentioned condition is set by performing an experiment or the like. Meanwhile, on this occasion, by setting the spring constant K2 at an appropriate value, only the movable plate 12 can be displaced with the actuating plate 13 displaced little.

If the mass of the first connecting portion 14 and so forth are negligible, the natural frequency is provided by an expression=the square root of (the spring constant K1/the mass of the movable plate 12)/2π. Meanwhile, in an ideal vibration system in which the mass of the first connecting portion 14 and so forth are negligible, even when the actuating plate 13 makes no displacement, the movable plate 12 makes a finite displacement.

Next, a method for fabricating the wavelength-tunable optical filter shown in FIGS. 1 and 2 will be briefly described. First, an SOI substrate having a predetermined thickness is prepared. Subsequently, the front surface of the substrate is subjected to patterning by photolithography so as to have a pattern applied thereon, corresponding to the shape shown in FIG. 2(*a*), and is then subjected to dry-etching so as to remove a silicon part of the upper silicon layer of the substrate other than the movable plate 12, the actuating plate 13, the first and second connecting portions 14 and 15, and the peripheral supporting portion 18. Likewise, the rear surface of the SOI substrate is subjected to patterning by lithography so as to have a pattern applied thereon, corresponding to the shape of the opening 16*a* and is then subjected to dry-etching so as to have the opening 16*a* formed therein. Subsequently, the SOI substrate is immersed in a hydrofluoric-acid solution so as to etch a silicon oxide of the substrate such that only the silicon oxide layer 17 remains. Then, the SOI substrate is subjected to thermal oxidization so as to have a silicon-oxide film formed thereon or to chemical vapor deposition (CVD) so as to have a silicon-nitride formed thereon. Finally, the antireflective film 20 and the reflective film 21 are fitted to the movable plate 12 so as to complete the SOI substrate.

Incidentally, it is not required to prepare the SOI substrate from the beginning; instead, the lower part of the peripheral supporting portion 18 may be fabricated by bonding a silicon-oxide substrate processed to have predetermined shapes to a separately processed silicon substrate, by direct bonding or the like.

The glass substrate 19 is manufactured in the following manner. A glass plate having a predetermined size is prepared. Chromium and gold films are formed on the rear surface of the glass plate, subjected to patterning by lithography, and then etched. Subsequently, the glass is etched in a hydrofluoric-acid solution or the like using the chromium and gold films as a mask so as to form the recess 22. By fitting the reflective film 23 and the antireflective film 24 thereon, the glass substrate 19 is completed.

The glass substrate 19 and the SOI substrate manufactured according to the above-mentioned steps are bonded to each other by anodic bonding or the like, so that the wavelength-tunable optical filter is completed.

In the first embodiment, although the lower part of the wavelength-tunable optical filter is formed of the SOI substrate, the filter may be constructed such that the movable plate 12, the actuating plate 13, the first and second connecting portions 14 and 15, and the peripheral supporting portion 18 are formed of a silicon substrate, and the lower part thereof below these members is composed of borosilicate glass.

According to the first embodiment, by disposing the movable plate 12 having the movable mirror fixed thereto and the actuating plate 13, independently of each other, and by connecting these plates 12 and 13 to each other with the first elastic connecting portion 14, the displacement of the movable plate 12 can be amplified more than that of the actuating plate 13, thereby realizing a wavelength-tunable optical filter in which a large displacement is generated at low voltage. In addition, by setting the mass of the actuating plate 13 at an appropriate value, the amplification factor of the displacement of the movable plate 12 can be controlled. Furthermore, by setting the spring constant K1 of the first connecting portion 14 such that the natural frequency of the vibration system formed by the movable plate 12 and the first connecting portion 14 agrees substantially with the frequency of an alternating voltage, a fine displacement of the actuating plate 13 causes the movable plate 12 to be greatly displaced.

Also, in the first embodiment, the actuating plate 13 has the opening 13*a* formed in the central part thereof, the movable plate 12 is disposed in the opening 13*a*, and each of the first and second connecting portions 14 and 15 is formed by a plurality of beams, thereby allowing the movable plate 12 to be displaced in a stable parallel state. In addition, the insulating film 25 composed of a silicon oxide or a silicon nitride is disposed, thereby preventing the actuating plate 13 and the base layer 16 from being short-circuited with each other. Furthermore, the movable plate 12, the actuating plate 13, and the first and second connecting portions 14 and 15 are integrally formed of the silicon layer of the SOI substrate, thereby easily fabricating a wavelength-tunable optical filter.

Second Embodiment

A second embodiment of the present invention proposes a wavelength-tunable optical filter which prevents a problem that, when the wavelength-tunable optical filter shown in FIGS. 1 and 2 is actuated with a pulse voltage or the like, the movable plate 12 moves beyond a desired position, that is, which prevents a so-called overshooting of the movable plate 12. An object of the second embodiment is to reduce the overshoot of the movable plate 12 relative to selection of a wavelength of light.

The structure of the wavelength-tunable optical filter according to the second embodiment is the same as that of the wavelength-tunable optical filter shown in FIGS. 1 and 2. Only differences are in the masses of the movable plate 12 and the actuating plate 13, and the spring constants K1 and K2 of the first and second connecting portions 14 and 15. Also, an operation and a manufacturing method of the filter according to the second embodiment are the same as those of the wavelength-tunable optical filter according to the first embodiment shown in FIGS. 1 and 2. Hence, the second embodiment will be described by using the same reference numbers.

Figure 4:
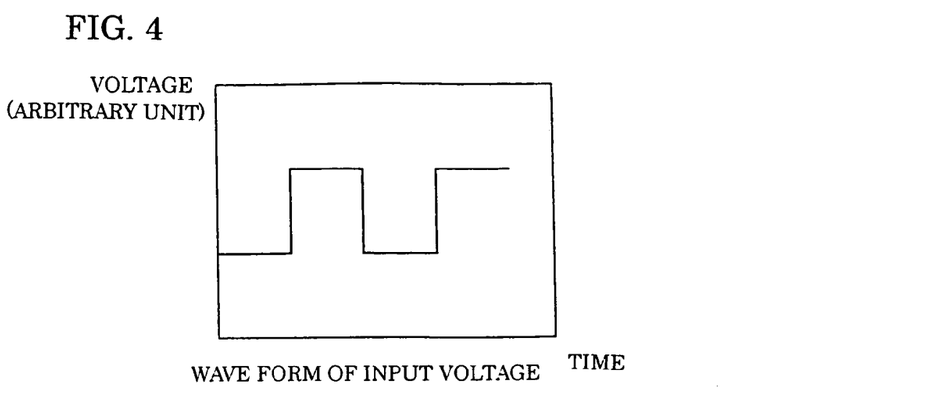
FIG. 4 is a graph illustrating a waveform of a pulse voltage used in a second embodiment.

FIG. 4 is a graph illustrating a waveform of a pulse voltage applied between the base layer 16 and the actuating plate 13. Meanwhile, it is assumed that the voltage is a binary pulse voltage in which the duration of time of each horizontal part of the pulse shown in the figure is sufficiently long.

Figure 5:
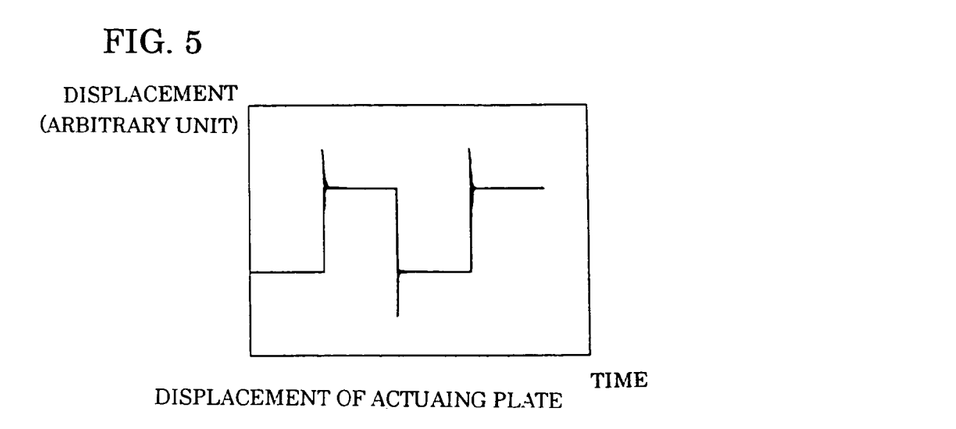
FIG. 5 is a graph illustrating the displacement of the actuating plate when the pulse voltage is applied.

FIG. 5 is a graph illustrating the displacement of the actuating plate 13 when the pulse voltage shown in FIG. 4 is applied. While it is essentially desirable that the actuating plate 13 is displaced exactly to each horizontal straight line in the graph shown in FIG. 5, it is known from the figure that the actuating plate 13 is overshot beyond the horizontal straight line due to a strong force momentarily generated upon change in the pulse voltage.

Figure 6:
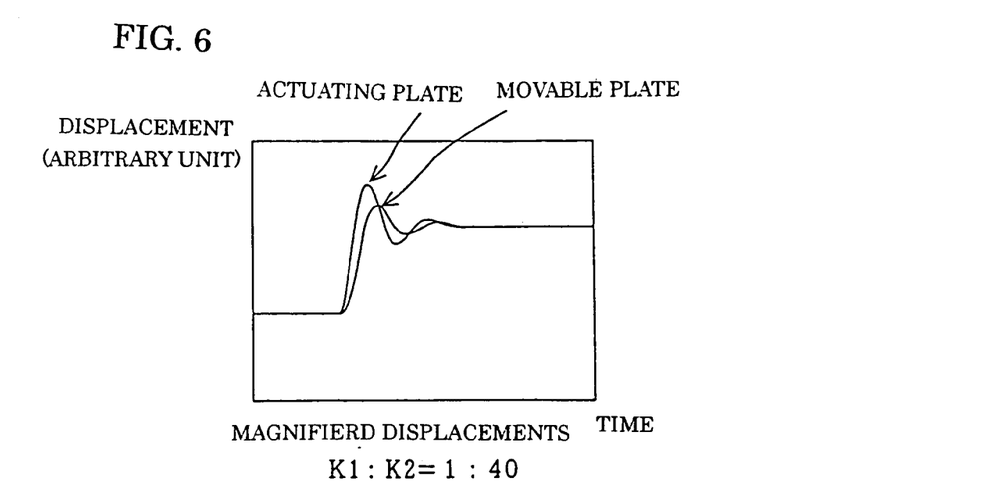
FIG. 6 is a graph illustrating the magnified displacements of the movable plate and the actuating plate before and after a change in the pulse voltage.

FIG. 6 is a graph illustrating the magnified displacements of the movable plate 12 and the actuating plate 13 before and after a change in the pulse voltage applied between the base layer 16 and the actuating plate 13. Incidentally, the wavelength-tunable optical filter shown in FIG. 6 has a structure in which the ratio of the mass of the movable plate 12 to that of the actuating plate 13 is 1 to 1, and the ratio of the spring constants K1 to K2 is 1 to 40. Under such a condition, it is known from the figure that the displacement (overshoot) of the movable plate 12 is reduced with respect to the displacement (overshoot) of the actuating plate 13; accordingly, the displacement of the movable plate 12, that is, the movable mirror (the reflective film 21) is made smaller. In general, in order to make the displacement (overshoot) of the movable plate 12 smaller, it is needed to analyze a vibrating system of the wavelength-tunable optical filter, taking the masses of the movable plate 12 and the actuating plate 13 and the spring constants K1 and K2 into consideration. In addition, when an actual wavelength-tunable optical filter is designed, an air resistance and the like must be taken into consideration. However, it has been experimentally known that, when the masses of the movable plate 12 and the actuating plate 13 are relatively close to each other, the displacement (overshoot) of the movable plate 12 can be reduced, by setting the spring constant K1 so as to be on the order of a fiftieth part of the spring constant K2.

According to the second embodiment, when a pulse voltage or the like is to be applied between the actuating plate 13 and the base layer 16, the overshoot of the movable plate 12 can be made smaller than that of the actuating plate 13, by setting the spring constant K1 of the first connecting portion 14 connecting the movable plate 12 to the actuating plate 13 at an appropriate value smaller than the spring constant K2 of the second connecting portion 15 connecting the actuating plate 13 to the peripheral supporting portion 18.

What is claimed is:

1. A wavelength-tunable optical filter, comprising:
a stationary mirror,
a movable mirror disposed so as to face the stationary mirror,
an actuating plate for actuating the movable mirror, and
a peripheral supporting portion supporting the actuating plate, the peripheral supporting portion and the actuating plate being disposed above a base layer,
wherein the movable mirror is displaced by applying a voltage between electrodes provided on the actuating plate and the base layer,
the actuating plate is disposed circumferentially around the movable mirror with a first opening between the actuating plate and the movable mirror and a second opening between the actuating plate and the peripheral supporting portion, and
the actuating plate and the movable mirror are connected by a plurality of spaced apart first connecting portions spanning the first opening, and the actuating plate and the peripheral supporting portion are connected by a plurality of spaced apart second connecting portions spanning the second opening.

2. The wavelength-tunable optical filter according to claim 1, further comprising a movable plate having the movable mirror fixed thereto, wherein the movable plate and the actuating plate are formed of a silicon-on-insulator substrate.

3. The wavelength-tunable optical filter according to claim 1, further comprising:
a movable plate having the movable mirror fixed thereto; and
wherein the movable plate, the actuating plate, the peripheral supporting portion, and the first and second connecting portions are formed of the same material.

4. The wavelength-tunable optical filter according to claim 3, wherein, the mass of the actuating plate is set such that the period of a natural frequency in a vibration system formed by the movable plate having the movable mirror, the actuating plate, the peripheral supporting portion, and the first and second connecting portions agrees with the period of the frequency of an alternating voltage to be applied between the electrodes.

5. The wavelength-tunable optical filter according to claim 3, wherein the spring constants of the first and second connecting portions respectively connecting the movable plate to the actuating plate and the actuating plate to the peripheral supporting portion are set such that the period of a natural frequency in a vibration system formed by the movable plate having the movable mirror, the actuating plate, the peripheral supporting portion, and the first and second connecting portions agrees with the period of the frequency of an alternating voltage to be applied between the electrodes.

6. The wavelength-tunable optical filter according to claim 1, wherein the displacement of the movable mirror is greater than that of the actuating plate caused by actuation.

7. The wavelength-tunable optical filter according to claim 1 wherein the displacement of the movable mirror is smaller than that of the actuating plate caused by actuation.

8. The wavelength-tunable optical filter according to claim 1, wherein at least one of the actuating plate and the base layer comprises an insulating film.

9. The wavelength-tunable optical filter according to claim 8, wherein the insulating film comprises either one of a silicon oxide and a silicon nitride.

10. The wavelength-tunable optical filter according to claim 1, wherein the first connecting portions connecting the movable plate and the actuating plate to each other comprises a plurality of beams.

11. The wavelength-tunable optical filter according to claim 1, wherein the second connecting portions connecting the actuating plate and the peripheral supporting portion to each other comprises a plurality of beams.

* * * * *